United States Patent
Devarakonda et al.

(10) Patent No.: US 9,149,768 B1
(45) Date of Patent: Oct. 6, 2015

(54) EMISSION CONTROL IN RICH BURN NATURAL GAS ENGINES

(71) Applicant: General Electric Company, Schenectady, NY (US)

(72) Inventors: Maruthi Narasinga Rao Devarakonda, Waukesha, WI (US); Robert Earl McDowell, Waukesha, WI (US); Dennis John Spaulding, Waukesha, WI (US); James Kristopher von der Ehe, Delafield, WI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/226,934

(22) Filed: Mar. 27, 2014

(51) Int. Cl.
*B01D 53/94* (2006.01)
*F01N 3/05* (2006.01)
*F01N 3/30* (2006.01)

(52) U.S. Cl.
CPC ........ *B01D 53/9459* (2013.01); *B01D 53/9477* (2013.01); *B01D 2255/904* (2013.01)

(58) Field of Classification Search
CPC .. B01D 53/9445; B01D 53/9454; F01N 3/05; F01N 3/101; F01N 3/30
See application file for complete search history.

(56) References Cited

U.S. PATENT DOCUMENTS

| | | | |
|---|---|---|---|
| 8,087,237 B2 | 1/2012 | Komuro | |
| 8,101,146 B2 | 1/2012 | Fedeyko et al. | |
| 2006/0150617 A1* | 7/2006 | Nishimura et al. | 60/289 |
| 2006/0179824 A1 | 8/2006 | Roser | |
| 2010/0000204 A1 | 1/2010 | Hemsley | |
| 2014/0079616 A1* | 3/2014 | Fedeyko et al. | 423/237 |
| 2014/0311126 A1* | 10/2014 | Gandhi et al. | 60/274 |
| 2015/0078975 A1* | 3/2015 | Mahakul, Budhadeb | 423/212 |

FOREIGN PATENT DOCUMENTS

| | | | | | |
|---|---|---|---|---|---|
| DE | 102005029585 | * | 1/2007 | | F01N 3/30 |
| EP | 2072774 A1 | * | 6/2009 | | F01N 3/30 |
| WO | WO 2008036908 A2 | * | 3/2008 | | F01N 3/20 |

OTHER PUBLICATIONS

European Search Report and Opinion issued in connection with corresponding EP Application No. 15159209.4 on Jul. 20, 2015.

* cited by examiner

*Primary Examiner* — Timothy Vanoy
(74) *Attorney, Agent, or Firm* — Cooper Legal Group, LLC

(57) ABSTRACT

A passive mid bed air injection apparatus for an engine includes a three way catalyst positioned in an exhaust stream of the engine. The three way catalyst reduces $NO_x$, CO and HC from the exhaust stream. The three way catalyst includes an ammonia slip catalyst positioned in the exhaust stream of the engine. The ammonia slip catalyst is positioned downstream from the three way catalyst and oxidizes $NH_3$ and CO from the exhaust stream. The three way catalyst includes an oxygen input disposed between the three way catalyst and the ammonia slip catalyst such that the oxygen input delivers air downstream from the three way catalyst and upstream from the ammonia slip catalyst. The oxygen input receives the air from a charged side of a forced induction device and delivers the air to the exhaust stream entering the ammonia slip catalyst. An associated method also provided.

16 Claims, 2 Drawing Sheets

US 9,149,768 B1

EMISSION CONTROL IN RICH BURN NATURAL GAS ENGINES

BACKGROUND OF THE INVENTION

1. Field of the Invention

The present invention relates generally to an emission control system/after treatment system for an engine and, in particular, to a passive mid bed air injection apparatus for an engine.

2. Discussion of the Prior Art

Natural gas engines are utilized in a number of different environments, including gas compression applications, power generation applications, oil field power generation applications, etc. Natural gas engines can be provided with a catalytic converter that converts pollutants/emissions from an exhaust stream of the engine into less toxic pollutants. In the past, engine exhaust was manipulated to be slightly richer (e.g., greater amount of fuel such that ratio of air to fuel is below stoichiometry) to improve reduction of pollutants from the exhaust stream such as unburned or partially burned hydrocarbons (HC), nitrogen oxides ($NO_x$), etc.

As a consequence of the engine exhaust being slightly richer, a larger amount of other pollutants, such as ammonia ($NH_3$), carbon monoxide (CO), etc., were present in the exhaust stream. Accordingly, there is a need, and it would be beneficial, to efficiently remove pollutants (e.g., ammonia ($NH_3$) and carbon monoxide (CO)) from the exhaust stream by increasing the amount of air in the catalytic converter without the use of active controls such that a ratio of air to fuel is above stoichiometry.

BRIEF DESCRIPTION OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect, the present invention provides a passive mid bed air injection apparatus for an engine. The mid bed air injection apparatus includes a three way catalyst positioned in an exhaust stream of the engine, the three way catalyst configured to reduce $NO_x$, CO and HC from the exhaust stream. The mid bed air injection apparatus includes an ammonia slip catalyst positioned in the exhaust stream of the engine. The ammonia slip catalyst is positioned downstream from the three way catalyst. The ammonia slip catalyst is configured to oxidize $NH_3$ and CO from the exhaust stream. The mid bed air injection apparatus includes an oxygen input disposed between the three way catalyst and the ammonia slip catalyst such that the oxygen input is configured to deliver air downstream from the three way catalyst and upstream from the ammonia slip catalyst. The oxygen input can receive the air from a charged side of a forced induction device and deliver the air to the exhaust stream entering the ammonia slip catalyst.

In accordance with another aspect, the present invention provides a passive mid bed air injection apparatus for an engine. The mid bed air injection apparatus includes a three way catalyst positioned in an exhaust stream of the engine, the three way catalyst configured to reduce $NO_x$, CO and HC from the exhaust stream. The mid bed air injection apparatus includes an ammonia slip catalyst positioned in the exhaust stream of the engine. The ammonia slip catalyst is positioned downstream from the three way catalyst. The ammonia slip catalyst is configured to oxidize $NH_3$ and CO from the exhaust stream. The mid bed air injection apparatus includes an air mixer disposed between the three way catalyst and the ammonia slip catalyst. The mid bed air injection apparatus includes an oxygen input disposed between the three way catalyst and the ammonia slip catalyst such that the oxygen input is configured to deliver air downstream from the three way catalyst and upstream from the ammonia slip catalyst. The oxygen input can receive the air from a charged side of a forced induction device and deliver the air to the air mixer. The air and the exhaust stream are mixed prior to entering the ammonia slip catalyst.

In accordance with another aspect, the present invention provides a method of reducing $NH_3$ emissions in an engine. The method includes providing a three way catalyst in an exhaust stream of the engine, the three way catalyst configured to reduce $NO_x$ and CO from the exhaust stream. The method includes providing an ammonia slip catalyst in the exhaust stream of the engine and downstream from the three way catalyst. The method includes delivering air from a charged side of a forced induction device to the exhaust stream entering the ammonia slip catalyst.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION OF THE INVENTION

Figure 1:
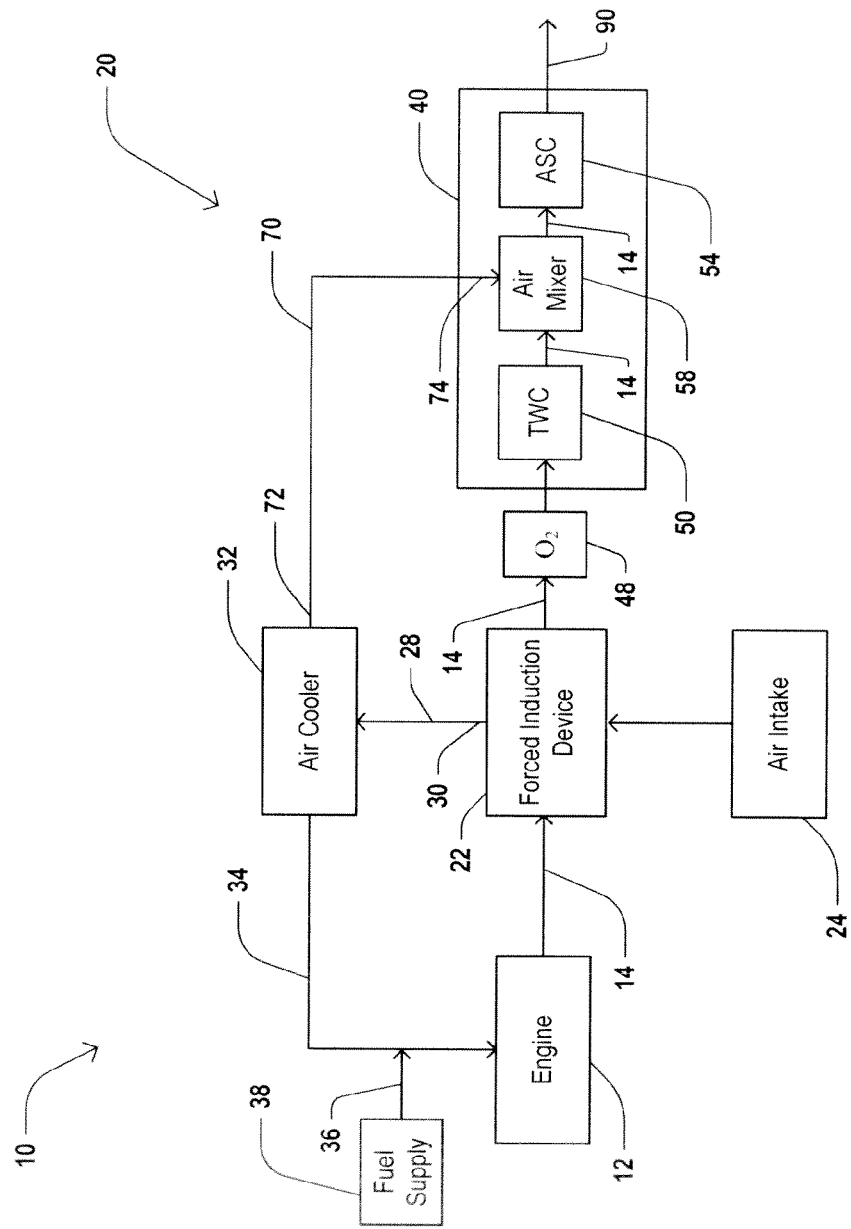
FIG. 1 is generic/schematic illustration of an example engine system for an engine including a passive mid bed air injection apparatus in accordance with an aspect of the present invention.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

FIG. 1 schematically illustrates an example engine system 10. It will be appreciated that the engine system 10 is illustrated somewhat generically/schematically in FIG. 1 for ease of illustration. Indeed, the engine system 10 includes any number of constructions, configurations, and/or structures, including pumps, cylinders, conduits, passageways, or the like.

The engine system 10 includes an engine 12, such as a natural gas engine, hydrocarbon-fueled engine, etc., for example. In general, the engine 12 includes any number of internal combustion engines, some of which may use natural gas. The engine 12 can be used in association with any number of environments/applications. Some example environments/applications in which the engine 12 may be provided include, but are not limited to, gas compression applications, power generation applications, oil field power generation applications, or the like. In some examples, the engine 12 is capable of converting energy into mechanical motion. The engine 12 illustrated in FIG. 1 and described herein is not specifically limited to the use of natural gas. Indeed, in some possible examples, the engine 12 may include fuels that run in an engine at λ (excess air ratio)=~1.0 and may include fuels such as propane, ethane, process gases, residue gases, field gases, gasoline, hydrocarbon fuels, diesel, natural gas, etc.

An exhaust stream 14 can flow from the engine 12. The exhaust stream 14 can include any number/mixture of gaseous emissions and/or byproducts from combustion of fuels by the engine 12. In some examples, the exhaust stream 14 may include some or all of carbon monoxide (CO), unburned or partially burned hydrocarbons (HC), nitrogen oxides ($NO_x$), and/or ammonia ($NH_3$).

The engine system 10 can include a passive mid bed air injection apparatus 20 for the engine 12. In some examples, a forced induction device 22 can be included as part of the mid bed air injection apparatus 20. The forced induction device 22 is illustrated generically/schematically in FIG. 1, as it will be appreciated that the forced induction device 22 includes any number of different structures. In one possible example, the forced induction device 22 includes a turbocharger. In another example, the forced induction device 22 includes a supercharger. In general, the forced induction device 22 can increase efficiency of the engine 12 by providing extra air into a combustion chamber of the engine 12.

In some examples, the supercharger can be used for boosting air intake for the engine 12. In other examples, including the illustrated example, the supercharger can also be used for increasing and/or boosting air to a catalyst (e.g., catalyst assembly 40). In some or all of these examples, the supercharger may include belt and/or gear driven superchargers, belt and/or gear driven piston pumps/compressors, centrifugal superchargers, vane superchargers, lobe (roots) superchargers, screw superchargers, etc. Indeed, it is to be appreciated that the supercharger includes any number of variations, constructions, structures, etc., some of which may be listed herein.

The forced induction device 22 (e.g., turbocharger, supercharger, etc.) is in fluid communication with an air intake 24. In an example, the air intake 24 can supply air to the forced induction device 22. In operation, the forced induction device 22 can receive the air from the air intake 24. Likewise, in some examples, the forced induction device 22 can receive the exhaust stream 14 from the engine 12. In general, the forced induction device 22 can compress the air received from the air intake 24. In some examples, such as when the forced induction device 22 includes a turbocharger, to assist in compressing the air, the exhaust stream 14 can cause rotation of a turbine within the forced induction device 22, which leads to compression of the air. In other examples, such as when the forced induction device 22 includes a supercharger, a compressor is belt driven, which leads to compression of the air.

Compressed air 28 can exit a charged side 30 of the forced induction device 22. In some examples, the compressed air 28 can be treated with an air cooler 32. For example, the compressed air 28 can flow through the air cooler 32, whereupon the compressed air 28 is cooled. In one example, cooled air 34 from the air cooler 32 is mixed with fuel 36 from a fuel supply 38. The combined cooled air 34 and fuel 36 can be provided to the engine 12 for combustion.

The exhaust stream 14 can flow from the forced induction device 22 towards a catalyst assembly 40 of the mid bed air injection apparatus 20. In some examples, the catalyst assembly 40 includes a single housing while, in other examples, the catalyst assembly 40 includes a plurality of housings. In the illustrated example, the catalyst assembly 40 can be positioned downstream from the engine 12 and the forced induction device 22.

In one possible example, the engine system 10 may include a sensor, such as an $O_2$ sensor 48. In the illustrated example, the $O_2$ sensor 48 can be positioned upstream from the catalyst assembly 40, such that the $O_2$ sensor 48 comprises a pre catalyst sensor. The $O_2$ sensor 48 can be positioned within the flow path of the exhaust stream 14, such that the $O_2$ sensor 48 can determine an air/fuel ratio of the exhaust stream 14. The $O_2$ sensor 48 is not limited to the illustrated position. In other examples, the $O_2$ sensor 48 may additionally or alternatively be positioned downstream from the catalyst assembly 40, such that the $O_2$ sensor 48 (or additional $O_2$ sensor) comprises a post catalyst sensor. In other examples, the $O_2$ sensor 48 may be positioned within the catalyst assembly 40 (e.g., between the three way catalyst 50 and ammonia slip catalyst 54).

The catalyst assembly 40 can include one or more catalyst materials. In this example, the catalyst assembly 40 includes a three way catalyst 50 (illustrated as "TWC" in FIG. 1). The three way catalyst 50 is illustrated generically/schematically in FIG. 1, as the three way catalyst 50 includes any number of constructions. In some examples, the three way catalyst 50 $CO_2$ and/or $H_2O$.

While the three way catalyst 50 can reduce $NO_x$, CO, and/or HC, other byproducts from the engine 12 may not be efficiently removed/reduced from the exhaust stream 14 by the three way catalyst 50. In an example, the engine 12 and the three way catalyst 50 may operate at a slightly richer mixture (e.g., greater amount of fuel such that ratio of air to fuel is below stoichiometry). By operating at a slightly richer mixture, the three way catalyst 50 may be more efficient and effective in removing/reducing $NO_x$, CO, and/or HC from the exhaust stream 14. However, a consequence of operating at the slightly richer mixture is that relatively higher concentrations of $NH_3$ (ammonia) and CO (carbon monoxide) are generated and present in the exhaust stream 14 downstream from the three way catalyst 50.

To assist in oxidizing/removing the $NH_3$ and CO, the catalyst assembly 40 can include an ammonia slip catalyst 54 (illustrated as "ASC" in FIG. 1) positioned in the exhaust stream 14 of engine 12. In the illustrated example, the ammonia slip catalyst 54 is positioned downstream from the three way catalyst 50 and downstream from an air mixer 58. The ammonia slip catalyst 54 is illustrated generically/schematically in FIG. 1, as the ammonia slip catalyst 54 includes any number of constructions. In some examples, the ammonia slip catalyst 54 includes one or more layers of active catalyst materials disposed on a surface/substrate. Based on the active catalyst materials, the ammonia slip catalyst 54 can oxidize (e.g., convert) any number of materials in the exhaust stream 14.

The ammonia slip catalyst 54 can oxidize (e.g., convert) at least some of $NH_3$ and/or CO from the exhaust stream 14. In one possible example, the ammonia slip catalyst 54 includes a molecular sieve that supports one or more materials that can oxidize $NH_3$. In some examples, the materials that can oxidize $NH_3$ include, but are not limited to, transition metals, platinum group metals (e.g., ruthenium (Ru), rhodium (Rh), palladium (Pd), rhenium (Re), iridium (Ir), platinum (Pt), and/or mixtures thereof), etc. In this example, at least some of the $NH_3$ and CO from the exhaust stream 14 can be converted to $N_2$, $CO_2$, etc.

The catalyst assembly 40 can include the air mixer 58. In some examples, the air mixer 58 is disposed between the three way catalyst 50 and the ammonia slip catalyst 54. For example, the air mixer 58 may be disposed downstream from the three way catalyst 50 and upstream from the ammonia slip catalyst 54. The air mixer 58 can be disposed within the exhaust stream 14, such that after the exhaust stream 14 exits the three way catalyst 50, some or all of the exhaust stream 14 may flow through the air mixer 58. In general, the air mixer 58 can mix the exhaust stream 14 with another source of gas or fluid.

The air mixer 58 can include any number of sizes/dimensions for mixing air. In one possible example, the air mixer 58 comprises a relatively larger diameter mixer such that the air mixer 58 has a size that is similar to a catalyst element size. In another example, the air mixer 58 comprises a relatively smaller diameter mixer such that the air mixer 58 has a size that is similar to an exhaust pipe size. Indeed, it is to be appreciated that, based on the specific requirements of the engine system 10, exhaust stream 14, etc., the air mixer 58 may include a wide range of sizes.

The mid bed air injection apparatus 20 can include an oxygen input 70. The oxygen input 70 can extend between the charged side 30 of the forced induction device 22 (e.g., from the air cooler 32) and the catalyst assembly 40. In the illustrated example, a first end 72 of the oxygen input 70 is in fluid communication with the charged side 30 of the forced induction device 22 while an opposing second end 74 of the oxygen input 70 is in fluid communication with the catalyst assembly 40. In such an example, a portion of the oxygen input 70 (e.g., the second end 74) is disposed between the three way catalyst 50 and the ammonia slip catalyst 54.

The oxygen input 70 includes a tube, channel, conduit, pipe, passageway, or the like through which air is delivered from the charged side 30 of the forced induction device 22 (e.g., from the air cooler 32) to the catalyst assembly 40. The oxygen input 70 can receive the air from the charged side 30 of the forced induction device 22 (e.g., from the air cooler 32) and deliver the air to the exhaust stream 14 that enters the ammonia slip catalyst 54. The air can be delivered passively to the oxygen input 70, such as through an opening at a location along the charged side 30, such as in or after the air cooler 32. In this example, the oxygen input 70 delivers the air downstream from the three way catalyst 50 and upstream from the ammonia slip catalyst 54. As such, the oxygen input 70 can bypass the engine 12.

In the illustrated example, the oxygen input 70 can deliver the air to the air mixer 58. It is to be appreciated that in some examples, there may be a limit on the quantity of air that is delivered through the oxygen input 70 to the exhaust stream 14 upstream from the ammonia slip catalyst 54. The air from the oxygen input 70 and the exhaust stream 14 may be mixed prior to entering the ammonia slip catalyst 54. As a result of providing air from the oxygen input 70 to the ammonia slip catalyst 54, the combination of air and the exhaust stream 14 entering the ammonia slip catalyst 54 is slightly leaner (e.g., larger amount of air such that ratio of air to fuel is above stoichiometry). By operating at a slightly leaner mixture, the ammonia slip catalyst 54 may be more efficient and effective in oxidizing (e.g., converting/reducing) the NH$_3$ and CO from the exhaust stream 14.

It will be appreciated that in some examples, the catalyst assembly 40 may not be provided with the air mixer 58. Instead, the air from the oxygen input 70 and the exhaust stream 14 may be combined prior to entering the ammonia slip catalyst 54 without the need for the air mixer 58. In such an example, the ammonia slip catalyst 54 may still oxidize the NH$_3$ and CO from the exhaust stream 14.

Additionally, it will be appreciated that the engine system 10 is not specifically limited to the illustrated structure/configuration. Indeed, in further possible examples, the engine system 10 may include other structures not illustrated herein. For example, the engine system 10 may include a dedicated (to mid-bed injection) air pump and/or air compressor. Such air pumps and/or air compressors may be utilized in engine systems 10 having draw-thru applications.

The exhaust stream 14 and air can pass through and exit the ammonia slip catalyst 54 in the form of exhaust 90. It will be appreciated that the exhaust 90 is illustrated generically/schematically with an arrowhead for ease of illustration in FIG. 1. In this example, the exhaust 90 can exit from an outlet, vent or the like in the catalyst assembly 40 downstream from the ammonia slip catalyst 54. As a result of the three way catalyst 50 and ammonia slip catalyst 54, the exhaust 90 can have a reduced quantity of pollutants, including carbon monoxide (CO), unburned or partially burned hydrocarbons (HC), nitrogen oxides (NO$_x$), and/or ammonia (NH$_3$). Furthermore, since the air is passively transferred to the oxygen input 70, active controls (e.g., pumps, valves, etc.) need not be provided to control flow of the air from the oxygen input 70 to the ammonia slip catalyst 54.

Figure 2:
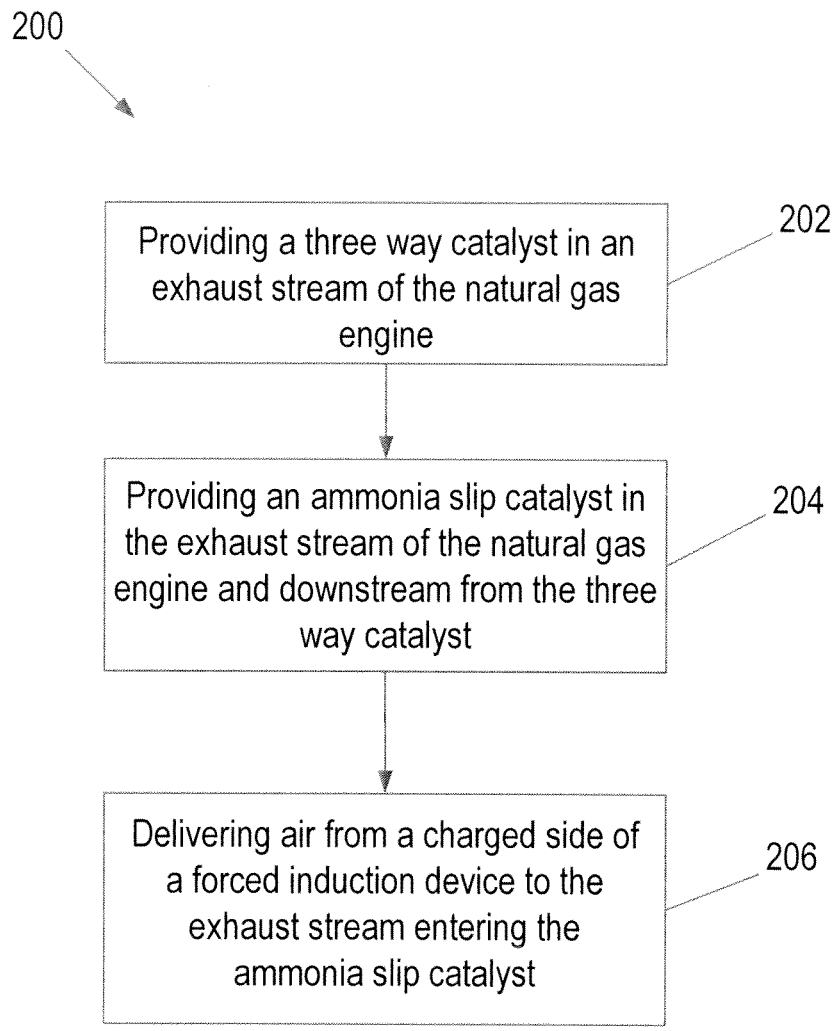
FIG. 2 is a flowchart depicting a method of reducing $NH_3$ emissions in an engine.

Turning now to FIG. 2, an example method 200 of reducing NH$_3$ emissions in the engine 12 is illustrated. The method 200 can be performed in association with the engine system 10 illustrated in FIG. 1.

The method 200 includes a step 202 of providing the three way catalyst 50 in the exhaust stream 14 of the engine 12. As illustrated in FIG. 1, the three way catalyst 50, as part of the catalyst assembly 40, is positioned downstream from the engine 12. As such, exhaust within the exhaust stream 14 is emitted from the engine 12, with the exhaust stream 14 being passed to and through the three way catalyst 50.

The method 200 includes a step 204 of providing the ammonia slip catalyst 54 in the exhaust stream 14 of the engine 12 and downstream from the three way catalyst 50. As illustrated in FIG. 1, the ammonia slip catalyst 54, as part of the catalyst assembly 40, is positioned downstream from the engine 12. Likewise, within the catalyst assembly 40, the ammonia slip catalyst 54 is positioned downstream from the three way catalyst 50. As such, the exhaust stream 14 may pass through the three way catalyst 50 and, after exiting the three way catalyst 50, may enter the ammonia slip catalyst 54.

The method 200 includes a step 206 of delivering air from the charged side 30 of the forced induction device 22 to the exhaust stream 14 entering the ammonia slip catalyst 54. As illustrated in FIG. 1, the air can be delivered from the charged side 30 of the forced induction device 22 (e.g., from the air cooler 32 in this example) to the catalyst assembly 40 through the oxygen input 70. In this example, the second end 74 of the oxygen input 70 can be in fluid communication with the air mixer 58, such that air from the oxygen input 70 is mixed with the exhaust stream 14. This mixture occurs downstream from the three way catalyst 50 and upstream from the ammonia slip catalyst 54. As such, the exhaust stream combined with the air that contacts the ammonia slip catalyst 54 is a slightly leaner mixture (e.g., larger amount of air such that ratio of air to fuel is above stoichiometry). As a result of this leaner mixture, the ammonia slip catalyst 54 may be more efficient and more effective in reducing (e.g., converting/oxidizing) the NH$_3$ and CO from the exhaust stream 14.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A passive mid bed air injection apparatus for an engine of, the mid bed air injection apparatus including:
   a three way catalyst positioned in an exhaust stream of the engine, the three way catalyst configured to reduce $NO_x$, CO and HC from the exhaust stream;
   an ammonia slip catalyst positioned in the exhaust stream of the engine, the ammonia slip catalyst positioned downstream from the three way catalyst, the ammonia slip catalyst configured to oxidize $NH_3$ and CO from the exhaust stream; and
   an oxygen input disposed between the three way catalyst and the ammonia slip catalyst such that the oxygen input is configured to deliver air downstream from the three way catalyst and upstream from the ammonia slip catalyst, the oxygen input configured to receive the air from a charged side of a forced induction device and deliver the air to the exhaust stream entering the ammonia slip catalyst;
   wherein the forced induction device includes a turbocharger.

2. The mid bed air injection apparatus of claim 1, wherein the oxygen input from the charged side of the forced induction device to the exhaust stream is configured to bypass the engine.

3. The mid bed air injection apparatus of claim 2, further including an air mixer disposed between the three way catalyst and the ammonia slip catalyst.

4. The mid bed air injection apparatus of claim 2, wherein the ammonia slip catalyst is configured to oxidize $NH_3$ from the exhaust stream by oxidizing at least some of the $NH_3$ to $N_2$.

5. The mid bed air injection apparatus of claim 1, wherein the engine includes fuels including propane, ethane, process gases, residue gases, field gases, and gasoline.

6. A passive mid bed air injection apparatus for an engine of, the mid bed air injection apparatus including:
   a three way catalyst positioned in an exhaust stream of the engine, the three way catalyst configured to reduce $NO_x$, CO and HC from the exhaust stream;
   an ammonia slip catalyst positioned in the exhaust stream of the engine, the ammonia slip catalyst positioned downstream from the three way catalyst, the ammonia slip catalyst configured to oxidize $NH_3$ and CO from the exhaust stream; and
   an oxygen input disposed between the three way catalyst and the ammonia slip catalyst such that the oxygen input is configured to deliver air downstream from the three way catalyst and upstream from the ammonia slip catalyst, the oxygen input configured to receive the air from a charged side of a forced induction device and deliver the air to the exhaust stream entering the ammonia slip catalyst;
   wherein the forced induction device includes a supercharger.

7. The mid bed air injection apparatus of claim 6, wherein the oxygen input from the charged side of the forced induction device to the exhaust stream is configured to bypass the engine.

8. The mid bed air injection apparatus of claim 7, further including an air mixer disposed between the three way catalyst and the ammonia slip catalyst.

9. The mid bed air injection apparatus of claim 7, wherein the ammonia slip catalyst is configured to oxidize $NH_3$ from the exhaust stream by oxidizing at least some of the $NH_3$ to $N_2$.

10. The mid bed air injection apparatus of claim 6, wherein the engine includes fuels including propane, ethane, process gases, residue gases, field gases, and gasoline.

11. A passive mid bed air injection apparatus for an engine, the mid bed air injection apparatus including:
    a three way catalyst positioned in an exhaust stream of the engine, the three way catalyst configured to reduce $NO_x$, CO and HC from the exhaust stream;
    an ammonia slip catalyst positioned in the exhaust stream of the engine, the ammonia slip catalyst positioned downstream from the three way catalyst, the ammonia slip catalyst configured to oxidize $NH_3$ and CO from the exhaust stream;
    an air mixer disposed between the three way catalyst and the ammonia slip catalyst; and
    an oxygen input disposed between the three way catalyst and the ammonia slip catalyst such that the oxygen input is configured to deliver air downstream from the three way catalyst and upstream from the ammonia slip catalyst, the oxygen input configured to receive the air from a charged side of a forced induction device and deliver the air to the air mixer, wherein the air and the exhaust stream are mixed by the air mixer prior to entering the ammonia slip catalyst.

12. The mid bed air injection apparatus of claim 11, wherein the forced induction device includes a turbocharger.

13. The mid bed air injection apparatus of claim 11, wherein the forced induction device includes a supercharger.

14. The mid bed air injection apparatus of claim 11, wherein the oxygen input from the charged side of the forced induction device to the exhaust stream is configured to bypass the engine.

15. The mid bed air injection apparatus of claim 14, wherein the ammonia slip catalyst is configured to oxidize $NH_3$ from the exhaust stream by oxidizing at least some of the $NH_3$ to $N_2$.

16. The method of claim 11, wherein the engine includes fuels including propane, ethane, process gases, residue gases, field gases, and gasoline.

* * * * *